United States Patent
Garbow et al.

(10) Patent No.: US 9,389,918 B2
(45) Date of Patent: *Jul. 12, 2016

(54) JOB PLAN SELECTION FOR REDUCING INSTABILITY OF A JOB WITHIN A HETEROGENEOUS STREAM PROCESSING APPLICATION

(75) Inventors: Zachary Adam Garbow, Rochester, MN (US); Michael Donald Pfeifer, Rochester, MN (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 1926 days.

This patent is subject to a terminal disclaimer.

(21) Appl. No.: 12/145,021

(22) Filed: Jun. 24, 2008

(65) Prior Publication Data

US 2009/0320039 A1 Dec. 24, 2009

(51) Int. Cl.
*G06F 9/50* (2006.01)
*G06F 9/48* (2006.01)
*G06F 11/34* (2006.01)

(52) U.S. Cl.
CPC ............ *G06F 9/5027* (2013.01); *G06F 9/4881* (2013.01); *G06F 9/5038* (2013.01); *G06F 11/3404* (2013.01)

(58) Field of Classification Search
CPC .. G06F 9/4881; G06F 9/5027; G06F 11/5027
See application file for complete search history.

(56) References Cited

U.S. PATENT DOCUMENTS

| | | | |
|---|---|---|---|
| 7,257,816 B2* | 8/2007 | Kulp et al. | 718/104 |
| 7,480,660 B1* | 1/2009 | Black | |
| 8,601,477 B2 | 12/2013 | Garbow et al. | |
| 2006/0017969 A1* | 1/2006 | Ly et al. | 358/1.15 |
| 2006/0218551 A1* | 9/2006 | Berstis et al. | 718/102 |
| 2007/0039001 A1* | 2/2007 | Briccarello et al. | 718/102 |
| 2008/0215409 A1* | 9/2008 | Van Matre | 705/8 |
| 2008/0256549 A1* | 10/2008 | Liu et al. | 718/106 |
| 2009/0037911 A1* | 2/2009 | Ahuja et al. | 718/100 |
| 2009/0320038 A1 | 12/2009 | Garbow et al. | |

OTHER PUBLICATIONS

Riabov et al., "Planning for Stream Processing Systems", IBM T.J. Watson Research Center, 2005, pp. 1205-1210.*
Douglis et al.; "Multi-site Cooperative Data Stream Analysis", SIGOPS Operating Systems Review, vol. 40, Issue 3, Jul. 2006, pp. 1-7.

* cited by examiner

*Primary Examiner* — David J Huisman
(74) *Attorney, Agent, or Firm* — Patterson + Sheridan, LLP

(57) ABSTRACT

Embodiments of the invention provide a method for reducing instability in a heterogeneous job plan of a stream processing application. In one embodiment, a job manager may be configured to select a job plan with the objective of minimizing the potential instability of the job plan. Each job plan may provide a directed graph connecting processing elements (both native and non-native). That is, each job plan illustrates data flow through the stream application framework. The job plan may be selected from multiple available job plans, or may be generated by replacing processing elements of a given job plan. Further, the job plan may be selected on the basis of other objectives in addition to an objective of minimizing the potential instability of the job plan, such as minimizing cost, minimizing execution time, minimizing resource usage, etc.

21 Claims, 5 Drawing Sheets

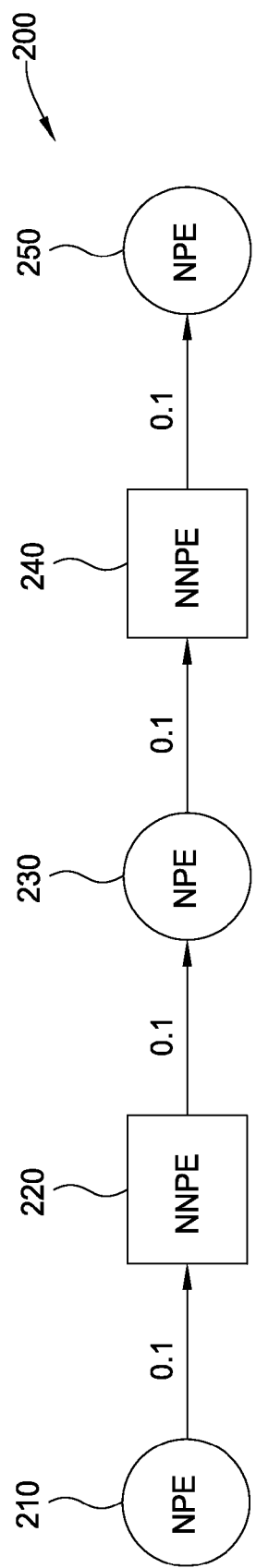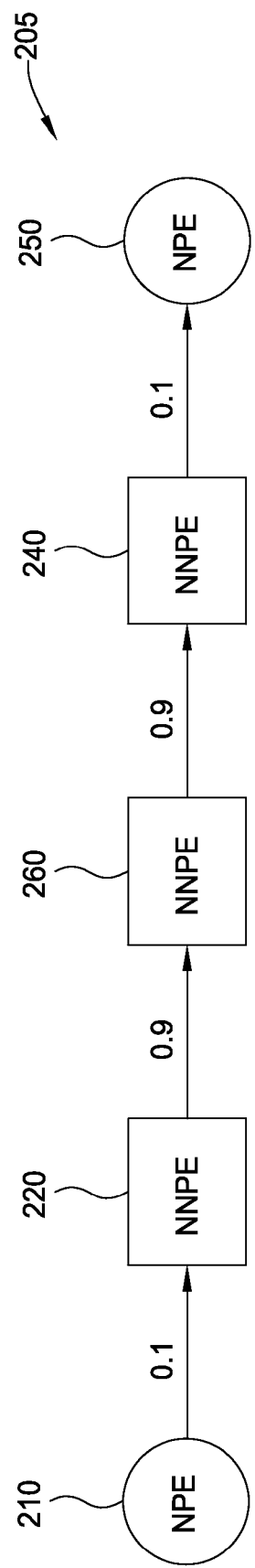

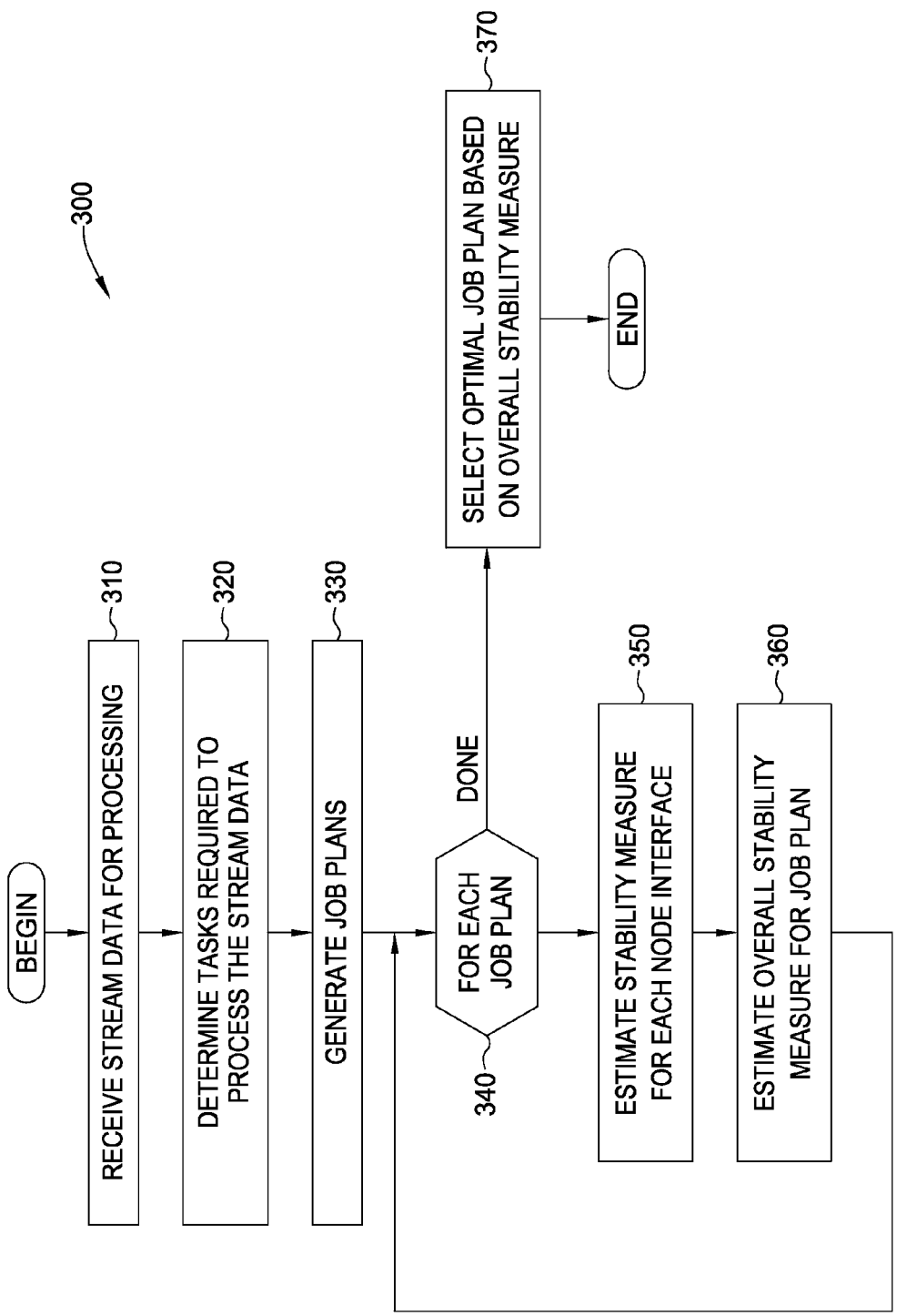

JOB PLAN SELECTION FOR REDUCING INSTABILITY OF A JOB WITHIN A HETEROGENEOUS STREAM PROCESSING APPLICATION

BACKGROUND OF THE INVENTION

1. Field of the Invention

Embodiments of the invention generally relate to computer processing. More specifically, embodiments of the invention are directed to reducing instability of a job of a heterogeneous stream processing application.

2. Description of the Related Art

Distributed computing systems, such as grid computing and computer clusters, are useful tools for breaking down large computing tasks, or jobs, into many smaller tasks that execute concurrently. Used in this manner, distributed systems are highly effective tools to perform large computing tasks in a minimal amount of time.

Distributed systems typically contain a large number of heterogeneous computing systems each providing one or more compute nodes or processors able to perform computing tasks independently from one another. High-speed data communication networks are used to coordinate computing activity, such as inter-node messaging. Because the heterogeneous systems have different hardware architectures, each provides different advantages in executing different types of software. For example, systems with large memories provide good architectures for running database applications.

In some situations, systems with a number of specialized processors are used for stream processing applications, meaning processing of a flow of information. For example, the System S stream processing framework available from IBM is designed to run in a heterogeneous hardware environment, taking advantage of x86, Cell, Blue Gene, or even Power-based servers. In particular, systems based on the Cell processor available from IBM appear to be a well-suited for these types of applications because of that processor's natural abilities as a stream computing platform. Suitable platforms can range from a single CPU up to 10,000 servers.

As the amount of data available to enterprises and other organizations dramatically increases, more and more companies are looking to turn this data into actionable information and knowledge. Addressing these requirements requires systems and applications that enable efficient extraction of knowledge and information from potentially enormous volumes and varieties of continuous data streams. Stream processing provides an execution platform for user-developed applications that ingest, filter, analyze, and correlate potentially massive volumes of continuous data streams. It supports the composition of new applications in the form of stream processing graphs that can be created on the fly, mapped to a variety of hardware configurations, and adapted as requests come and go and relative priorities shift.

SUMMARY OF THE INVENTION

One embodiment of the invention includes a computer-implemented method. The method generally includes: receiving a first job plan configured to process a data stream, wherein the first job plan is composed according to a stream processing framework, wherein the first job plan comprises a directed sequence of processing elements, wherein the first job plan includes one or more processing elements that are not part of the framework, and wherein the data stream is passed between processing elements by use of a plurality of processing element interfaces according to the directed sequence of processing elements specified by the first job plan; calculating a stability measure for the first job plan; generating a second job plan having fewer processing element interfaces between the one or more processing elements that are not part of the framework and one or more processing elements that are part of the framework; calculating a stability measure for the second job plan; and upon determining that the stability measure of the second job plan is higher that the stability measure of the first job plan, processing the data stream according to the second job plan.

Another embodiment of the invention includes a computer-readable storage medium containing a program, which when executed on a processor performs an operation. The operation may generally include: receiving a first job plan configured to process a data stream, wherein the first job plan is composed according to a stream processing framework, wherein the first job plan comprises a directed sequence of processing elements, wherein the first job plan includes one or more processing elements that are not part of the framework, and wherein the data stream is passed between processing elements by use of a plurality of processing element interfaces according to the directed sequence of processing elements specified by the first job plan; calculating a stability measure for the first job plan; generating a second job plan having fewer processing element interfaces between the one or more processing elements that are not part of the framework and one or more processing elements that are part of the framework; calculating a stability measure for the second job plan; and upon determining that the stability measure of the second job plan is higher that the stability measure of the first job plan, processing the data stream according to the second job plan.

Still another embodiment of the invention includes a system having a processor and a memory containing a program, which when executed by the processor is configured to perform an operation. The operation may generally include: receiving a first job plan configured to process a data stream, wherein the first job plan is composed according to a stream processing framework, wherein the first job plan comprises a directed sequence of processing elements, wherein the first job plan includes one or more processing elements that are not part of the framework, and wherein the data stream is passed between processing elements by use of a plurality of processing element interfaces according to the directed sequence of processing elements specified by the first job plan; calculating a stability measure for the first job plan; generating a second job plan having fewer processing element interfaces between the one or more processing elements that are not part of the framework and one or more processing elements that are part of the framework; calculating a stability measure for the second job plan; and upon determining that the stability measure of the second job plan is higher that the stability measure of the first job plan, processing the data stream according to the second job plan.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIGS. 2A-B each illustrate an example of a candidate job plan for use in executing a stream processing application, according to one embodiment of the invention.

FIG. 3 is a flow diagram illustrating a method for selecting one of a plurality of job plans for executing a stream processing application, according to one embodiment of the invention.

DETAILED DESCRIPTION OF THE PREFERRED EMBODIMENTS

Figure 1:
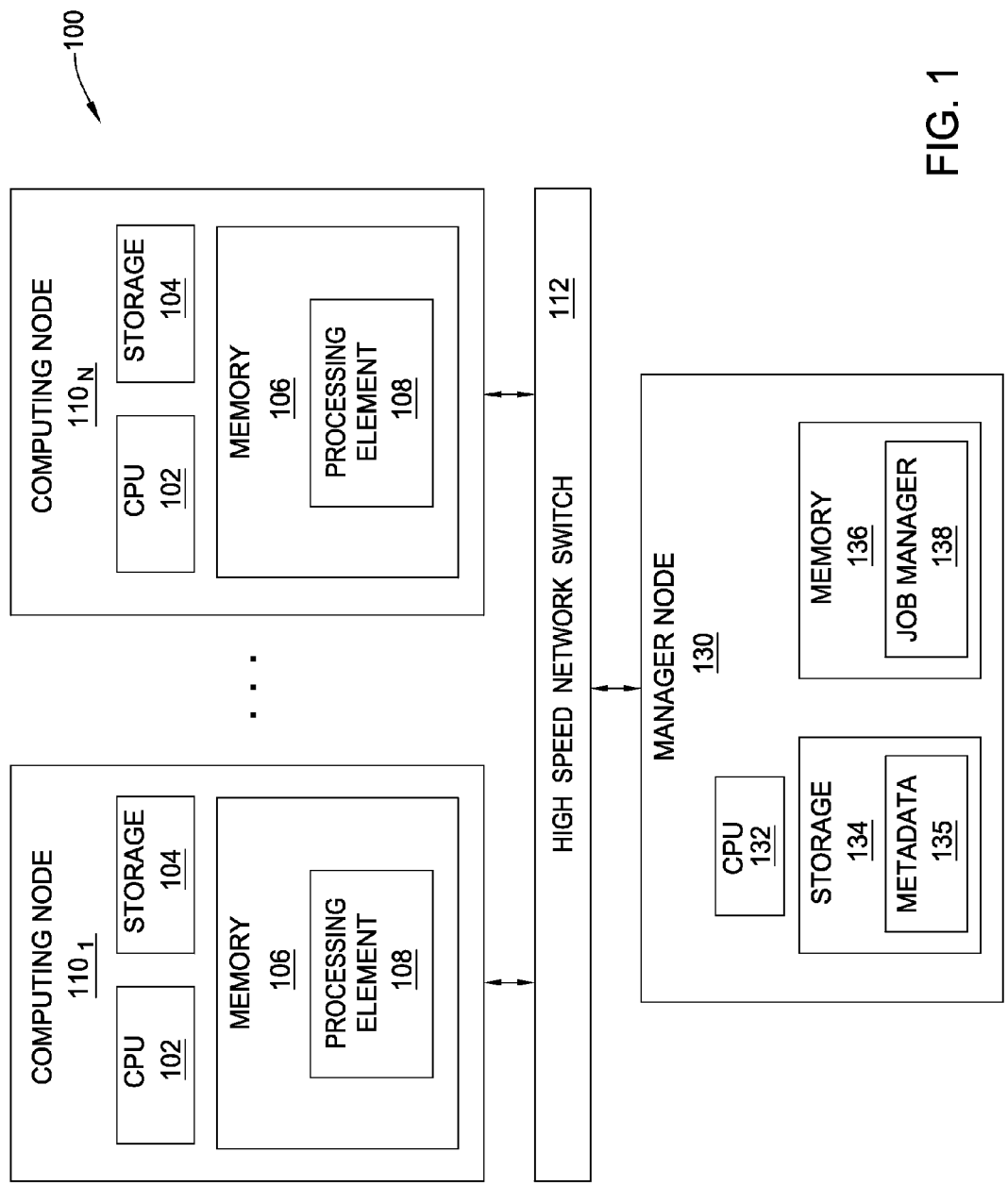
FIG. 1 illustrates a high level architecture of a computing cluster, according to one embodiment of the invention.

In stream processing applications, data is received by a processing system in the form of a flow of information. Examples of stream processing applications include audio processing, video processing, transaction processing, sensor processing, and the like. One type of stream processing system is composed of multiple nodes, with each node representing a separate processing element (also known as "analytics"). In such a system, each processing element may perform a separate processing task upon a data stream. For example, various processing elements may be used to analyze, filter, and annotate a data stream. The task performed by each processing element may be specified in a job plan. The job plan may be generated by a job manager application.

Generally, stream processing applications may be composed using a primary stream processing framework, meaning that each component of an application must comply with a given programming model (i.e., each component must have defined attributes, interfaces, formats, etc.). The processing elements composed within the primary stream processing framework may be described as "native" processing elements. Further, stream processing applications may also include "non-native" processing elements, meaning processing elements composed with frameworks other that the primary stream processing framework. Applications having both native and non-native processing elements may be referred to as "heterogeneous stream processing applications." In such applications, the non-native processing elements are generally not directly compatible with the native processing elements, and thus must be "wrapped" with adapter classes to make them compatible. A stream processing application including both native and non-native processing elements (via adapter interfaces) is hereinafter referred to as a "heterogeneous stream processing application."

In some situations, a job manager may compose a heterogeneous job plan, meaning a job plan that includes both native and non-native processing elements. For example, the job manager may determine that a first task is performed most rapidly by a given native processing element, and a second task performed most rapidly by a given non-native processing element. In this example, the heterogeneous job plan may provide the fastest overall completion time for the job. However, one possible problem with heterogeneous job plans is that they may become unstable (i.e., may fail or produce unexpected results) due to transitions between native and non-native processing elements.

Embodiments of the invention provide a method for reducing instability in a heterogeneous job plan of a stream processing application. In one embodiment, a job manager may be configured to select a job plan with the objective of minimizing the potential instability of the job plan. Each job plan may provide a directed graph connecting processing elements (both native and non-native). That is, each job plan illustrates data flow through the stream application framework. The job plan may be selected from multiple available job plans, or may be generated by replacing processing elements of a given job plan. Further, the job plan may be selected on the basis of other objectives in addition to an objective of minimizing the potential instability of the job plan, such as minimizing cost, minimizing execution time, minimizing resource usage, etc.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 is a block diagram that illustrates a computing system 100 configured for stream processing, according to one embodiment of the invention. Of course, the computing system 100 is shown for illustrative purposes, and is not intended to limit the present invention. Embodiments of the invention may be adapted use with a variety of distributed computer systems, including grid computing, computing clusters, adaptive architecture supercomputing, and the like. Further, embodiments of the invention may be implemented using other environments, regardless of whether the computer systems are complex multi-user computing systems, such as a cluster of individual computers connected by a high-speed network, single-user workstations, or network appliances lacking non-volatile storage. Further, the software applications illustrated in FIG. 1 and described herein may be implemented using computer software applications executing on existing computer systems, e.g., desktop computers, server computers, laptop computers, tablet computers, and the like. However, the software applications described herein are not limited to any currently existing computing environment or programming language, and may be adapted to take advantage of new computing systems as they become available.

As shown, computing system 100 includes computing nodes $110_1$-$110_N$ and a manager node 130, connected via a high-speed network switch 112. Of course, those skilled in the art will recognize that FIG. 1 provides a simplified representation of a stream processing system, and that the computing system 100 may include a number of different and/or additional elements.

As shown, each computing node 110 may include a CPU 102, storage 104 and memory 106, typically connected by a bus (not shown). CPU 102 is a programmable logic device that performs all the instruction, logic, and mathematical processing in a computer. Storage 104 includes hard-disk drives, flash memory devices, optical media and the like. Memory 106 includes a processing element 108. In one embodiment, each processing element 108 may represent a software application configured to perform a separate processing task upon a data stream. That is, the processing elements 108 included in the various computing nodes $110_1$-$110_N$ may perform various processing tasks on a data stream, such as analysis, filtering, annotating, and the like. Further, each computing node 110 may include multiple processing elements 108.

As shown, the manager node 130 may include a CPU 132, storage 134 and memory 136, typically connected by a bus (not shown). CPU 132 is a programmable logic device that performs all the instruction, logic, and mathematical processing in a computer. Storage 134 includes hard-disk drives, flash memory devices, optical media and the like. The storage 134 includes metadata 135, representing data used by the job manager 138 in generating job plans. The metadata 135 is described further below. The memory 136 includes a job manager 138, representing a software application configured to generate a job plan. The job plan may specify a sequence of tasks (i.e., workflow) performed by the processing elements 108 to process stream data received by the computing system 100.

As used herein, the instability of a job plan or data interface refers to the likelihood of unexpected or undesired results in executing the job plan or data interface as part of a stream processing application. For example, the instability of a job plan could refer to the likelihood that a given input will be processed correctly (or incorrectly) by one of the processing elements. Such job instability could manifest itself by a processing element 108 that produces incorrect results for some (or a specific) set of inputs. However, such processing errors might result whenever such a processing element is used as part of any job plan or only when that processing element is used in conjunction with one or more other processing elements. In one embodiment, such instabilities may be described by an instability measure (e.g., a probability that a job plan or interface will suffer unexpected or undesired results in a given execution). Alternatively, such instabilities may be estimated from a stability measure (e.g., a probability that a job plan or interface will not suffer unexpected or undesired results in a given execution).

In one embodiment, the job manager 138 may be configured to generate a job plan with the objective of minimizing the potential instability of the job plan. More specifically, the job manager 138 may estimate a stability measure for each data interface between the processing elements specified in a given job plan. The job manager 138 may then combine the estimated stabilities of all the data interfaces in order to estimate the stability of the job plan as a whole. Optionally, the stability of the job plan may be also based on stabilities of individual processing elements, or on stabilities of particular combinations of processing elements. Further, the job manager 138 may select a job plan that has a high estimate of overall stability, or may select a job plan that is more stable than other available job plans. For example, the job manager 138 may generate a job plan that minimizes data interfaces between native processing elements (NPEs) and non-native processing elements (NNPEs), thus reducing the potential instability of the job plan. Optionally, the job manager 138 may require that a generated job plan have a stability estimate that is equal to or higher than a predefined threshold for acceptable stability.

In one embodiment, the stability estimates generated by the job manager 138 may be based on metadata (e.g., metadata 135 shown in FIG. 1) describing the stability of interfaces between various combinations of processing elements. The metadata 135 may represent, e.g., predefined benchmarks of the expected stability of a given combination of processing elements. For example, the metadata 135 may specify that a given heterogeneous interface (i.e., from an NPE to an NNPE, or from an NNPE to an NPE) is likely to result in a low stability measure (e.g., 0.1, or a 10% probability of executing normally), whereas a given homogeneous interface (i.e., between two NPEs, or between two NNPEs) is likely to result in a relatively higher stability measure (e.g., 0.9, or a 90% probability of executing normally). Alternatively, the metadata 135 may represent historical data generated during past instances of executing job plans. For example, the job manager 138 may be configured to analyze the stability of various combinations of heterogeneous and homogeneous processing elements, and to store data describing the stability of such combinations in the metadata 135. Optionally, the metadata 135 may also describe the stability of the interface in terms of the type of data passed within the interface (e.g., audio data, video data, transaction data, sensor data, etc.).

In one embodiment, the job manager 138 may be configured to select a job plan from multiple candidate job plans with the objective of minimizing instability. The candidate job plans may be generated by the job manager 138, may be previously-generated job plans, or may be a combination of both generated and previously-generated job plans. The previously-generated job plans may be stored in the storage 134. Exemplary methods for generating job plans with the objective of reducing instability are described below with reference to FIGS. 3-4.

In one embodiment, the job manager 138 may generate a job plan that includes other objectives in addition to an objective of minimizing the potential instability of the job plan. Such additional objectives may include, e.g., minimizing cost, minimizing execution time, minimizing resource usage, and the like. For example, the job manager 138 may identify multiple candidate job plans (i.e., job plans that may be used to execute a particular application) by analyzing various combinations and orderings of processing elements. In the event that multiple job plans are determined to minimize instability equally, the job manager 138 may then select a final job plan by considering additional objectives (e.g., which job plan will execute fastest, at the lowest cost, using the fewest resources, etc.).

In one embodiment, the job manager 138 may be configured to generate a job plan based on specified preferences for prioritizing multiple objectives. For example, a user may specify a percentage for each objective (e.g., 70% reducing instability, 30% reducing execution time), indicating a relative importance to be allocated to each objective in generating the job plan. The job manager 138 may be configured to calculate a stability measure and an estimated execution time for each job plan. The stability measure may be, e.g., a percent probability that executing a job plan will be stable. The estimated execution time may then be normalized (i.e., converted to a unit-less number), so as to allow comparison between the two aspects. For example, the job manager 138 may be configured to normalize the estimated execution time by dividing it by a time baseline, thus resulting in a unit-less ratio of estimated execution time to a baseline time. The normalized execution time measure may then be multiplied by the respective objective percentage, thus reflecting the relative importance specified by the user.

FIGS. 2A-2B each illustrate an example of a candidate job plan for use in executing a stream processing application, according to one embodiment of the invention. FIG. 2A illustrates a first candidate job plan 200, which includes five nodes 210-250. Illustratively, the job plan 200 describes a flow of stream data (represented by arrows) through multiple processing elements (represented by nodes 210-250) of a stream processing application. Thus, job plan 200 is represented as directed graph connecting native processing elements (NNPEs) and non-native processing elements (NPEs). Each of nodes 210-250 provides a processing element configured to perform a different step on a stream of data flowing through the stream application. In one embodiment, the job plan 200 may be generated by the job manager 138 shown in FIG. 1. The nodes 210-250 included in the job plan 200 may represent examples of the computing nodes $110_1$-$110_N$ shown in FIG. 1.

In this example, nodes 210, 230 and 250 each represent a native processing element (NPE). This is illustrated in FIG. 2A by showing these nodes as circles that include the label "NPE." Further, nodes 220 and 240 each represent a non-native processing element (NNPE). This is illustrated in FIG. 2A by showing these nodes as squares that include the label "NNPE." Furthermore, assume for this example that nodes 220 and 240 represent compatible NNPEs, meaning they are composed with the same (or similar) stream processing frameworks. Finally, assume that each node of job plan 200 represents a processing element configured to perform a different task. For example, the node 210 may be an NPE for performing an analysis task, the node 220 may be an NNPE for performing a filtering task, the node 230 may be an NPE for performing an annotation task, and so forth.

As shown, data passing between two nodes of the job plan 200 is represented by arrows. Thus, each arrow may represent an interface between two processing elements (whether native or non-native). Note, each arrow is shown to include a numerical value. Assume for this example, that these numerical values represent a measure of the stability of an interface, with a value of 0.0 indicating a lowest measure of stability and a value of 1.0 indicating a highest measure of stability. Generally, interfaces between heterogeneous nodes (i.e., between an NPE and an NNPE) are more unstable than interfaces between homogeneous nodes (i.e., between two NPEs, or between two NNPEs). In the case of job plan 200, each interface is between heterogeneous nodes. Thus, each arrow shown in the job plan 200 includes a stability measure of 0.1, indicating a relatively unstable interface.

In one embodiment, the stability measure of each interface in a job plan is used to determine a stability measure for the overall job plan. For example, the job manager 138 may be configured to sum the stability measures of the interfaces to get an overall stability measure for the job plan (i.e., 0.1+0.1+0.1+0.1=0.4). Of course, the overall stability measure for the job plan may be calculated by other techniques (e.g., averaging the interface stability measures, etc.).

FIG. 2B illustrates a second candidate job plan 205, according to one embodiment of the invention. In this example, the second job plan 205 represents an alternative to the job plan 200 shown in FIG. 2A. That is, the second job plan 205 may be used to execute the exemplary stream processing application, in place of the job plan 200. Note, in both cases the stream processing application represented by the job plans 200 and 205 are assumed to operate on the same data stream (i.e., the same inputs to the initial processing elements) as well as produce the same outputs (i.e., the same outputs from the final processing elements). However, the job plans may differ in the processing elements used to perform the job. For example, the plans may use a different processing element (or a different sequence of processing elements) to achieve a given result. Alternatively, one processing element may have different versions, and in such a case, the different versions may have different levels of stability (either individually or in conjunction with other specific processing elements). Also note, in the second job plan 205, the third node 230 has been replaced by a new node 260. In other words, an NPE (third node 230) has been replaced by an NNPE (new node 260) that provides similar stream processing functionality. Thus, either the first job plan 200 or the second job plan 205 may be used to execute the exemplary stream processing application. However, note that in the case of the second job plan 205, the stability measure of the interface after the second node 220 has been increased from 0.1 to 0.9. This increase in the stability measure is due to the second node 220 and the new node 260 both being NNPEs, meaning the interface is between compatible nodes. Similarly, the stability measure of the interface before the fourth node 240 has also been increased from 0.1 to 0.9. As a result, the second job plan 205 has a higher overall stability measure than the job plan 200.

As described, the job manager 138 may be configured to select a job plan from multiple candidate job plans based on an objective of minimizing instability in executing a stream processing application. Thus, in this situation, the job manager 138 would select the second job plan 205 for executing the stream processing application, since it has a higher stability measure than job plan 200.

FIG. 3 is a flow diagram illustrating a method 300 for selecting one of a plurality of job plans for executing a stream processing application, according to one embodiment of the invention. Persons skilled in the art will understand that, even though the method is described in conjunction with the system of FIG. 1, any system configured to perform the steps of method 300, in any order, is within the scope of the present invention.

The method 300 begins at step 310, where a job manager application 138 (shown in FIG. 1) receives stream data for processing. For example, the job manager 138 may receive stream data such as audio data, video data, transaction data, sensor data, and the like. At step 320, the tasks required to process the stream data may be determined. For example, the job manager 138 may determine a sequence of tasks for processing streamed transaction data (e.g., analyzing, filtering, annotating, etc.). At step 330, the job manager 138 may generate multiple job plans for executing the tasks determined at step 320. For example, the job manager application 138 may generate the job plan 200, 205 (shown in FIGS. 2A-2B) to execute the tasks determined to be required for processing the stream data.

At step 340, the method 300 enters a loop (steps 340, 350, and 360) to evaluate each job plan generated at step 330. At step 350, the job manager 138 may estimate a stability measure for each node interface of the current job plan. In one embodiment, the stability measure may be based on metadata (e.g., metadata 135 shown in FIG. 1) describing the stability of interfaces between various combinations of processing elements. For example, the metadata 135 may include historical data describing an observed stability of various combinations of processing elements. At step 360, the job manager 138 may estimate an overall stability measure for the current job plan. For example, the job manager 138 may add the stability measures for each node interface estimated at step 350 to estimate an overall stability measure.

Once the job plans generated at step 330 are evaluated, the method 300 continues at step 370, where an optimal job plan may be selected based on the overall stability measures estimated for each job plan at step 350. For example, the job manager 138 may select the job plan having the lowest overall stability measure (meaning the job plan likely to be the most stable). After step 370, the method 300 terminates.

Figure 4:
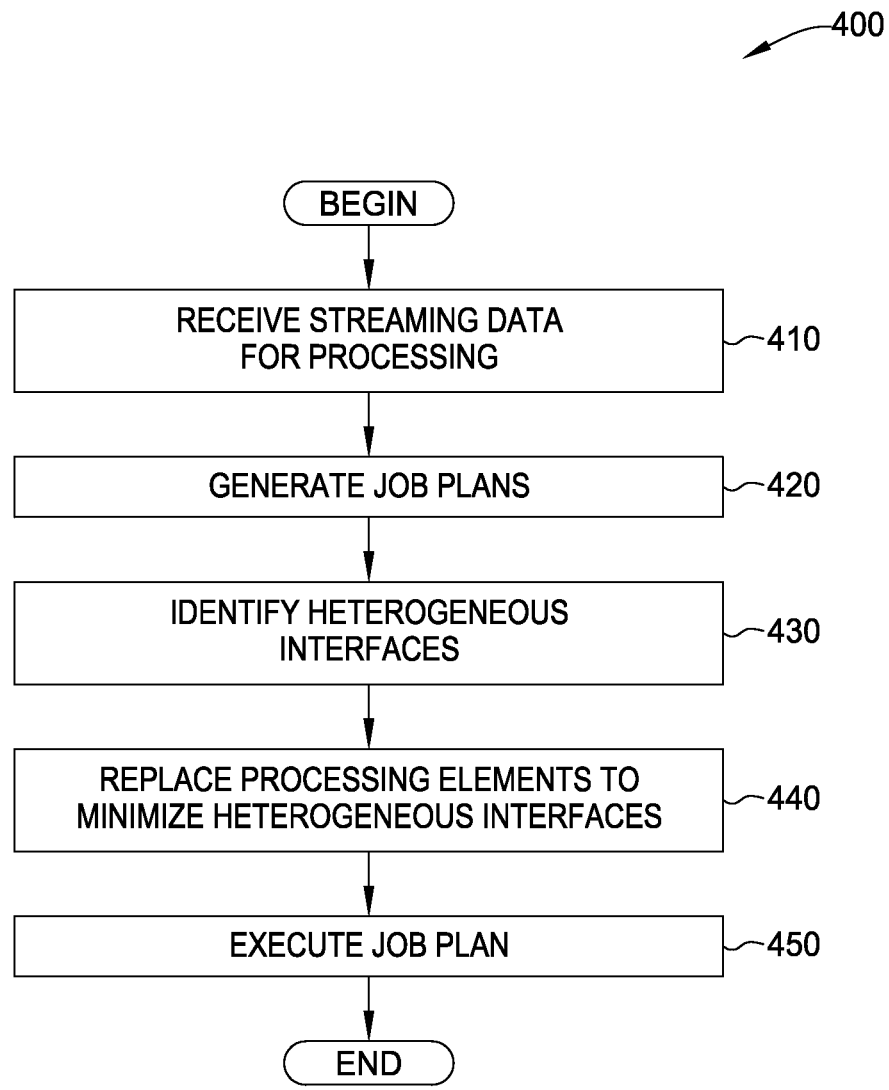
FIG. 4 is a flow diagram illustrating a method for generating a job plan for executing a stream processing application, according to one embodiment of the invention.

In one embodiment, the job manager 138 may be configured to modify a single job plan with the objective of minimizing instability. FIG. 4 is a flow diagram illustrating a method 400 for modifying a job plan for executing a stream processing application, according to one embodiment of the invention. Persons skilled in the art will understand that, even though the method is described in conjunction with the system of FIG. 1, any system configured to perform the steps of method 400, in any order, is within the scope of the present invention.

The method 400 begins at step 410, where a job manager application 138 (shown in FIG. 1) receives a description of stream data to be processed. For example, the job manager 138 may receive a description of stream data such as audio data, video data, transaction data, sensor data, and the like. At step 420, the job manager 138 may generate a job plan for processing the stream data. The job plan may specify a sequence of tasks (e.g., analyzing, filtering, annotating, etc.) to be performed by various processing elements. Alternatively, the job manager 138 may receive an existing job plan for processing the stream data. At step 430, the job manager 138 may identify heterogeneous interfaces between processing elements of the job plan. That is, the interfaces between native processing elements (NPEs) and non-native processing elements (NNPEs) may be identified.

At step 440, the job manager application 138 may replace processing elements in order to minimize the number of heterogeneous interfaces in the job plan. For example, in the job plans shown in FIGS. 2A-2B, the third element 230 (an NPE) may be replaced by the new element 260 (an NNPE), thereby decreasing the number of heterogeneous interfaces in the final job plan. At step 450, the final job plan may be executed. For example, the final job plan may be executed by the computing nodes $110_1$-$110_N$ shown in FIG. 1. After step 450, the method 400 terminates.

Figure 5:
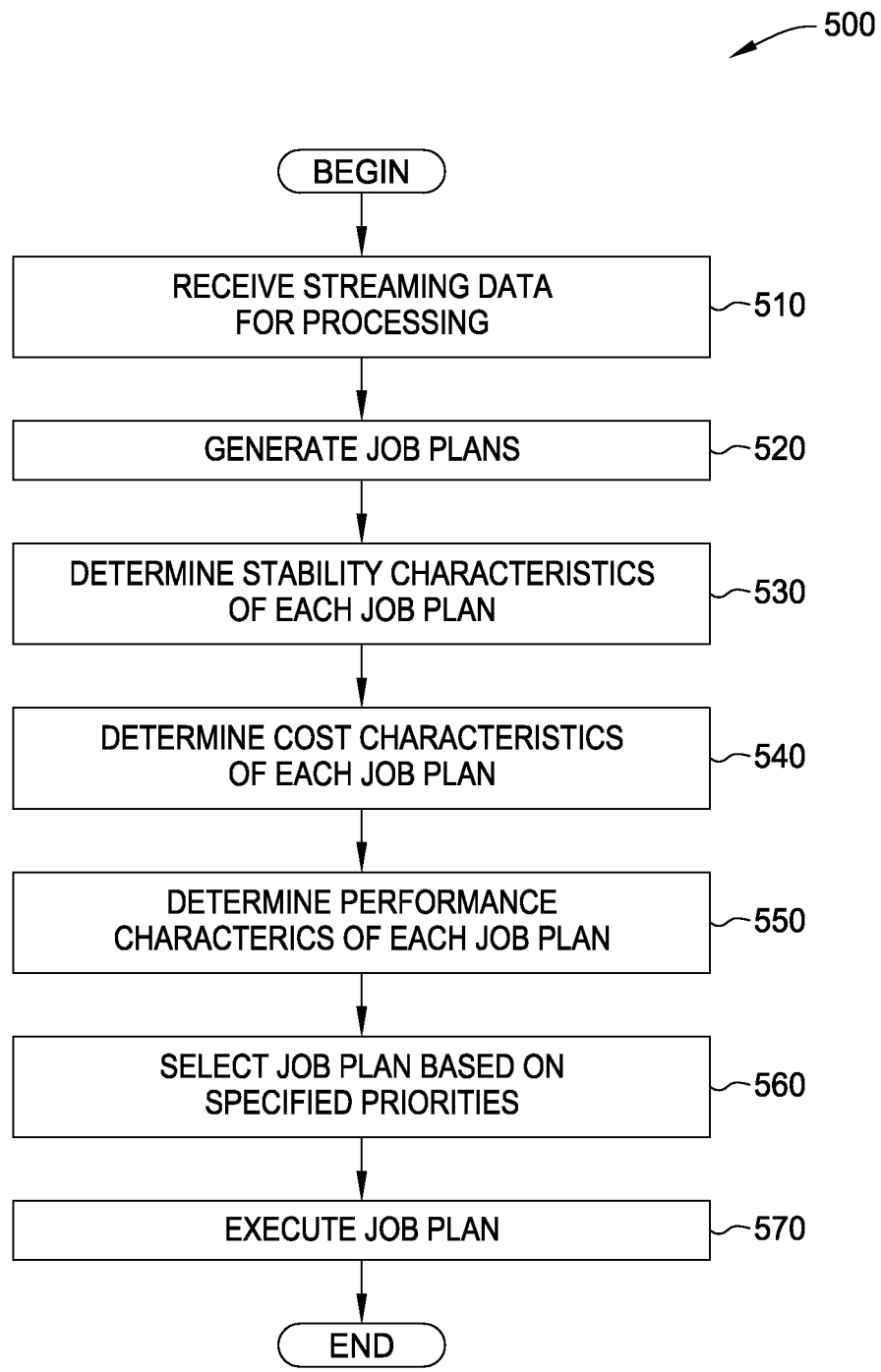
FIG. 5 is a flow diagram illustrating a method for selecting a job plan for executing a stream processing application based on multiple objectives, according to one embodiment of the invention.

FIG. 5 is a flow diagram illustrating a method 500 for selecting a job plan for executing a stream processing application based on multiple objectives, according to one embodiment of the invention. Persons skilled in the art will understand that, even though the method is described in conjunction with the system of FIG. 1, any system configured to perform the steps of method 500, in any order, is within the scope of the present invention.

The method 500 begins at step 510, where a job manager application 138 (shown in FIG. 1) receives stream data for processing. For example, the job manager 138 may receive stream data such as audio data, video data, transaction data, sensor data, and the like. At step 520, the job manager 138 may generate a plurality of job plans for processing the stream data. Each job plan may specify a sequence of tasks (e.g., analyzing, filtering, annotating, etc.) to be performed by various processing elements. At step 530, the job manager 138 may determine stability characteristics of each job plan. For example, the determined stability characteristics may be an estimate of the stability of each job plan, or an estimate of the instability of each job plan.

At step 540, the job manager application 138 may determine cost characteristics of each job plan. For example, the determined cost characteristics may include the financial cost of using each processing element, e.g., each processing element may be licensed per use, per user, per processor, etc. At step 550, the job manager application 138 may determine performance characteristics of each job plan. For example, the determined performance characteristics may include the processing time required to perform each task of the job plan, the processing time required for the entire job plan, etc. Further, the performance characteristics may include an estimate of resource use required to execute the job plan. Such resource use may include hard-drive space, processing cycles, memory allocation, time to complete, etc.

At step 560, an optimal job plan may be selected based on predefined criteria for the characteristics determined at step 530, 540, and 550. That is, the job manager 138 may select the job plan having the characteristics that most closely match criteria specifying preferred priorities for stability, cost, and performance objectives. For example, a user may enter criteria specifying a 50% weight on stability, a 30% weight to cost, and 20% weight on performance. At step 570, the selected job plan may be executed. For example, the selected job plan may be executed by the computing nodes $110_1$-$110_N$ shown in FIG. 1. After step 570, the method 500 terminates.

While the foregoing is directed to embodiments of the present invention, other and further embodiments of the invention may be devised without departing from the basic scope thereof, and the scope thereof is determined by the claims that follow.

What is claimed is:

1. A computer-implemented method, comprising:
receiving a first job plan specifying a sequence of tasks for processing a data stream using a first directed sequence of processing elements, wherein at least one of the first directed sequence of processing elements is part of a stream processing framework, wherein one or more of the first directed sequence of processing elements are not part of the stream processing framework but are each configured to interact with the stream processing framework by way of a respective adapter, and wherein the data stream is passed between processing elements by use of a plurality of processing element interfaces according to the first directed sequence of processing elements specified by the first job plan;
calculating a first stability measure that estimates a likelihood for the first job plan, when executed, to produce erroneous results, by calculating a respective interface stability measure for each of the plurality of processing element interfaces, wherein each interface stability measure is based at least in part on one of: (i) whether the respective interface is from a native processing element to a non-native processing element, (ii) whether the respective interface is from a non-native processing element to a native processing element, (iii) whether the respective interface is between two native processing elements, and (iv) whether the respective interface is between two non-native processing elements;
generating a second job plan specifying the sequence of tasks for processing the data stream using a second directed sequence of processing elements, distinct from the first directed sequence of processing elements, such that the second job plan includes fewer, relative to the first job plan, processing element interfaces between processing elements that are not part of the stream processing framework and processing elements that are part of the stream processing framework;
calculating a second stability measure that estimates a likelihood for the second job plan, when executed, to produce erroneous results; and
upon determining that the second job plan is less likely to produce erroneous results by comparing the first stability measure and the second stability measure, processing the data stream according to the second job plan.

2. The method of claim 1, wherein calculating the stability measures of the first and second job plans is based on metadata describing the first and second stability of interfaces between various combinations of processing elements.

3. The method of claim 2, further comprising:
updating the metadata based on the results of processing the data stream according to the second job plan.

4. The method of claim 1, wherein generating the second job plan comprises replacing at least one processing element that is not part of the stream processing framework with at least one processing element that is part of the stream processing framework.

5. The method of claim 1, wherein generating the second job plan comprises replacing at least one processing element that is part of the stream processing framework with at least one processing element that is not part of the stream processing framework.

6. The method of claim 1, wherein calculating the first and second stability measures of the first and second job plans is based on the likelihood of failure in processing element interfaces between various combinations of processing elements.

7. The method of claim 1, wherein calculating the first and second stability measures of the first and second job plans is based on the likelihood of unexpected results in processing element interfaces between various combinations of processing elements.

8. A non-transitory computer readable medium containing a program which, when executed, performs an operation, the operation comprising:
receiving a first job plan specifying a sequence of tasks for processing a data stream using a first directed sequence of processing elements, wherein at least one of the first directed sequence of processing elements is part of a stream processing framework, wherein one or more of the first directed sequence of processing elements are not part of the stream processing framework but are each configured to interact with the stream processing framework by way of a respective adapter, and wherein the data stream is passed between processing elements by use of a plurality of processing element interfaces according to the first directed sequence of processing elements specified by the first job plan;
calculating a first stability measure that estimates a likelihood for the first job plan, when executed, to produce erroneous results, by calculating a respective interface stability measure for each of the plurality of processing element interfaces, wherein each interface stability measure is based at least in part on one of: (i) whether the respective interface is from a native processing element to a non-native processing element, (ii) whether the respective interface is from a non-native processing element to a native processing element, (iii) whether the respective interface is between two native processing elements, and (iv) whether the respective interface is between two non-native processing elements;
generating a second job plan specifying the sequence of tasks for processing the data stream using a second directed sequence of processing elements, distinct from the first directed sequence of processing elements, such that the second job plan includes fewer, relative to the first job plan, processing element interfaces between processing elements that are not part of the stream processing framework and processing elements that are part of the stream processing framework;
calculating a second stability measure that estimates a likelihood for the second job plan, when executed, to produce erroneous results; and
upon determining that the second job plan is less likely to produce erroneous results by comparing the first stability measure and the second stability measure, processing the data stream according to the second job plan.

9. The non-transitory computer readable medium of claim 8, wherein calculating the first and second stability measures of the first and second job plans is based on metadata describing the stability of interfaces between various combinations of processing elements.

10. The non-transitory computer readable medium of claim 9, the operation further comprising:
updating the metadata based on the results of processing the data stream according to the second job plan.

11. The non-transitory computer readable medium of claim 8, wherein generating the second job plan comprises replacing at least one processing element that is not part of the stream processing framework with at least one processing element that is part of the stream processing framework.

12. The non-transitory computer readable medium of claim 8, wherein generating the second job plan comprises replacing at least one processing element that is part of the stream processing framework with at least one processing element that is not part of the stream processing framework.

13. The non-transitory computer readable medium of claim 8, wherein calculating the first and second stability measures of the first and second job plans is based on the likelihood of failure in processing element interfaces between various combinations of processing elements.

14. The non-transitory computer readable medium of claim 8, wherein calculating the first and second stability measures of the first and second job plans is based on the likelihood of unexpected results in processing element interfaces between various combinations of processing elements.

15. A system, comprising:
a processor; and
a memory containing a program which, when executed, performs an operation, the operation comprising:
receiving a first job plan specifying a sequence of tasks for processing a data stream using a first directed sequence of processing elements, wherein at least one of the first directed sequence of processing elements is part of a stream processing framework, wherein one or more of the first directed sequence of processing elements are not part of the stream processing framework but are each configured to interact with the stream processing framework by way of a respective adapter, and wherein the data stream is passed between processing elements by use of a plurality of processing element interfaces according to the first directed sequence of processing elements specified by the first job plan;
calculating a first stability measure that estimates a likelihood for the first job plan, when executed, to produce erroneous results, by calculating a respective interface stability measure for each of the plurality of processing element interfaces, wherein each interface stability measure is based at least in part on one of: (i) whether the respective interface is from a native processing element to a non-native processing element, (ii) whether the respective interface is from a non-native processing element to a native processing element, (iii) whether the respective interface is between two native processing elements, and (iv) whether the respective interface is between two non-native processing elements;
generating a second job plan specifying the sequence of tasks for processing the data stream using a second directed sequence of processing elements, distinct from the first directed sequence of processing elements, such that the second job plan includes fewer, relative to the first job plan, processing element interfaces between processing elements that are not part of the stream processing framework and processing elements that are part of the stream processing framework;
calculating a second stability measure that estimates a likelihood for the second job plan, when executed, to produce erroneous results; and
upon determining that the second job plan is less likely to produce erroneous results by comparing the first stability measure and the second stability measure, processing the data stream according to the second job plan.

16. The system of claim 15, wherein calculating the first and second stability measures of the first and second job plans is based on metadata describing the stability of interfaces between various combinations of processing elements.

17. The system of claim 15, the operation further comprising:
updating the metadata based on the results of processing the data stream according to the second job plan.

18. The system of claim 15, wherein generating the second job plan comprises replacing at least one processing element that is not part of the stream processing framework with at least one processing element that is part of the stream processing framework.

19. The system of claim 15, wherein generating the second job plan comprises replacing at least one processing element that is part of the stream processing framework with at least one processing element that is not part of the stream processing framework.

20. The system of claim 15, wherein calculating the first and second stability measures of the first and second job plans is based on the likelihood of failure in processing element interfaces between various combinations of processing elements.

21. The system of claim 15, wherein calculating the first and second stability measures of the first and second job plans is based on the likelihood of unexpected results in processing element interfaces between various combinations of processing elements.

* * * * *